United States Patent
Tao et al.

(10) Patent No.: US 12,077,706 B2
(45) Date of Patent: Sep. 3, 2024

(54) HYBRID SILICONE COMPOSITE FOR HIGH TEMPERATURE APPLICATIONS

(71) Applicants: TE Connectivity Services GmbH, Schaffhausen (CH); TE Connectivity Germany GmbH, Bensheim (DE)

(72) Inventors: Dejie Tao, Fremont, CA (US); Yiliang Wu, San Ramon, CA (US); Lananh Pham, Fremont, CA (US); Lei Wang, San Jose, CA (US); Ting Gao, Palo Alto, CA (US); Andre Martin Dressel, Lampertheim (DE); Frank Schabert, Nuremberg (DE)

(73) Assignees: TE CONNECTIVITY SERVICES GMBH, Schaffhausen (CH); TE CONNECTIVITY GERMANY GMBH, Bensheim (DE)

( * ) Notice: Subject to any disclaimer, the term of this patent is extended or adjusted under 35 U.S.C. 154(b) by 403 days.

(21) Appl. No.: 17/161,128

(22) Filed: Jan. 28, 2021

(65) Prior Publication Data

US 2022/0235271 A1  Jul. 28, 2022

(51) Int. Cl.
| | |
|---|---|
| C09K 21/14 | (2006.01) |
| C08G 77/04 | (2006.01) |
| C08K 3/22 | (2006.01) |
| C08K 3/26 | (2006.01) |
| C09K 21/02 | (2006.01) |
| H01M 50/128 | (2021.01) |
| H01M 50/129 | (2021.01) |
| H01M 50/143 | (2021.01) |

(52) U.S. Cl.
CPC .............. *C09K 21/14* (2013.01); *C08G 77/04* (2013.01); *C08K 3/22* (2013.01); *C08K 3/26* (2013.01); *C09K 21/02* (2013.01); *H01M 50/128* (2021.01); *H01M 50/129* (2021.01); *H01M 50/143* (2021.01); *C08K 2003/2206* (2013.01); *C08K 2003/2224* (2013.01); *C08K 2003/2227* (2013.01); *C08K 2003/262* (2013.01); *C08K 2003/267* (2013.01)

(58) Field of Classification Search
CPC ........ C09K 21/14; C09K 21/02; C08G 77/04; C08K 3/22; C08K 3/26; C08K 2003/2206; C08K 2003/2224; C08K 2003/2227; C08K 2003/262; C08K 2003/267; C08K 2003/265; H01M 50/128; H01M 50/129; H01M 50/143; C08L 2201/02; C08L 83/04; C08L 2205/025; C08L 2203/20
See application file for complete search history.

(56) References Cited

U.S. PATENT DOCUMENTS

| | | | | |
|---|---|---|---|---|
| 4,269,753 A | * | 5/1981 | Mine | H01B 3/46 524/588 |
| 5,082,886 A | | 1/1992 | Jeram et al. | |
| 10,030,143 B2 | | 7/2018 | Ye et al. | |
| 2003/0166777 A1 | * | 9/2003 | Vachon | C08L 83/04 525/100 |
| 2007/0078251 A1 | * | 4/2007 | Farhat | C09K 3/1018 524/588 |
| 2009/0246499 A1 | | 10/2009 | Katsoulis et al. | |
| 2020/0123427 A1 | * | 4/2020 | Endo | C08J 7/043 |

FOREIGN PATENT DOCUMENTS

| | | | |
|---|---|---|---|
| CN | 101522838 A | | 9/2009 |
| CN | 105778504 A | | 7/2016 |
| EP | 2 100 921 | * | 9/2009 |
| KR | 10-1827343 B1 | | 2/2018 |

OTHER PUBLICATIONS

Guo, Jingang, et al., "Characteristic Properties of High Consistency Rubber and Liquid Silicone Rubber", 2018 IEEE Conference on Electrical Insulation and Dielectric Phenomena (CEIDP), IEEE, Oct. 21, 2018, pp. 223-226.
European Search Report for European Application No. 22153438.1, dated Jul. 4, 2022.
Search Report for Chinese Patent Application No. 202210085314.0, mailed Feb. 1, 2023.

* cited by examiner

*Primary Examiner* — Robert T Butcher

(57) ABSTRACT

A hybrid silicone composite for high temperature insulation applications is disclosed. The hybrid silicone composite is formed of a mixture of liquid high consistency silicone rubber and solid high consistency silicone rubber and a thermally decomposable inorganic filler which are compounded together. The compounded material is then injection molded, over molded, compression molded, cast, laminated, extruded, calendered, adhered or dispensed. When the silicone composite is exposed to a high temperature, it forms an inorganic composite and maintains its insulating properties and dimensional stability.

11 Claims, 4 Drawing Sheets

HYBRID SILICONE COMPOSITE FOR HIGH TEMPERATURE APPLICATIONS

FIELD OF THE INVENTION

The present invention is directed to a hybrid silicone composite comprising a mixture of a solid form of high consistency silicone rubber and a liquid form of high consistency silicone rubber in combination with an inorganic filler, which results in good overall mechanical properties and can be easily processed.

BACKGROUND OF THE INVENTION

There are many applications that require insulation that can withstand high temperatures. Ceramic or glass materials are commonly used as high temperature insulation materials. Ceramic or glass materials are also relatively rigid and hard and cannot easily be used in many applications due to their rigidity and hardness. These materials are relatively brittle and cannot be used in applications in which there are vibratory forces or in applications where the insulation materials have to be bent around a small radius. Furthermore, these ceramic or glass materials have higher manufacturing costs than other materials.

Plastic materials consist of a wide range of synthetic or semi-synthetic organic compounds. Plastic materials are generally malleable and can easily be molded into solid objects. Plastics generally have good insulative properties at low temperatures, generally less than 300° C., but cannot be used as insulating materials at high temperatures because they melt. Plastic materials generally cost less to manufacture than ceramic or glass materials.

Silicone composites have been used in a wide variety of fields as insulating materials because of their physical and electrical properties. It is known that electric wires and cables covered with silicone rubber or silicone composites have improved physical strength as well as improved electrical insulation properties. However, these wire or cable coverings of silicone rubber or silicone composites burn away when they are exposed to high temperatures above 500° C. which results in a decrease or loss of electrical insulating performance as well as mechanical stability. Therefore, these silicone composites are not suitable for high temperature applications in which the composites should maintain their shapes, have sufficient strength, and remain electrically insulative.

U.S. Pat. No. 4,269,753 (Mine et al.) describes a siloxane composition which can be converted to an elastomer or resin at normal curing temperatures but will ceramify upon firing to higher temperatures to give flexible ceramics having electrical insulating properties and excellent physical properties. The composition consists essentially of (a) 100 parts by weight of a siloxane copolymer consisting essentially of $R_3SiO_{1/2}$ units wherein R is a monovalent organic radical having 1-10 carbon atoms and containing at least two unsaturated groups and at least two alkoxy groups bound to silicon atoms per molecule, (b) 0-600 parts by weight of a linear or branched organopolysiloxane polymer having at least two unsaturated groups bound to silicon atoms per molecule, (c) an organopolysiloxane having at least two hydrogen atoms bonded to silicon atoms per molecule, (d) 3-300 parts by weight of a ceramic forming filler substance, and (e) a catalytic amount of an addition reaction catalyst wherein in components (a), (b) and (c) the mole ratio of hydrogen atoms bound to silicon atoms to unsaturated groups bound to silicon is from 0.5/1 to 10/1 and the total number of unsaturated groups in component (a) and component (b) and the total number of hydrogen atoms bonded to silicon atoms in component (c) is at least 5. When a solid substrate is coated with this composition, and heated to 500° C. or higher, it forms a ceramic. The ceramic forming filler substance is not thermally decomposable.

The article, "Investigation of Ceramifying Process of Modified Silicone—Silicate Compositions", J Mater Sci, 42 (15), 6046-6055, August 2007, describes the addition of glass frits to silicone based composites to improve low temperature ceramification at elevated temperatures. The article concludes that glass frits melt at a temperature below the mica-silica eutectic temperature and combine with the inorganic fillers and pyrolysis products of silicone rubber to assist the formation of a ceramic. Glass frits react with the filler and silica matrix to form a liquid intermediate phase which bonds the fillers and silica matrix together rendering strength to the char.

International Publication Number WO2010/097705 A1 (Nexans) describes a fire performance material and cable including the material. The publication describes a fire performance material comprising a polymer including a silicone polymer, and a calcium carbonate filler, characterized in that the calcium carbonate filler is present in the material in an amount to leave post-combustion residue after exposure of such material to fire, the material including less than 50 parts by weight of ceramizable filler to 100 parts by weight of polymer. The calcium carbonate has a high decomposition temperature of about 840° C. The mixture decomposes on exposure to fire to provide a protective layer.

The article, "The Thermal Stabilisation and Ceramifying of Silicone Rubbers", International Polymer Science and Technology, 43 (4), T33-T40, April 2016, discusses the need to find additives, fillers and catalysts that substantially increase the service life of siloxane elastomer composites at temperatures above 300° C. or that promote the formation of ceramic-like materials using a combustion process. Silicone rubbers possess high heat resistance and do not release toxic products on thermal degradation or combustion. Additives, fillers, and catalysts are added to the silicone rubbers which are then processed on conventional extrusion equipment to form sheets, profiles or coatings. Under conditions of fire, a refractory of ceramic can be formed by the composite. Many of these composites use platinum as an additive to increase the flame resistance. The article also describes a method for the manufacture of a cable with a ceramifying silicon sheath based on a silicone elastomer, calcium carbonate and an additional glass-forming filler. When exposed to a flame, the sheath decomposes providing a protective or electrical insulation layer on the lead.

U.S. Pat. No. 5,942,571 (Nakamura) describes a liquid silicone rubber composition for use in high voltage electrical insulating parts. The composition comprises a polyorganosiloxane containing alkenyl groups, fumed silica, a polyorganohydridosiloxane, a platinum type catalyst, finely powdered aluminum hydroxide and a powdered metal compound selected from the group consisting of powdered zinc oxide, powdered zinc borate, and powdered magnesium hydroxide. This patent also describes a method for manufacturing such composition.

U.S. Pat. No. 7,695,819 B2 (Farhat et. al.) describes solid organopolysiloxane elastomers which are useful in gasketing applications. The elastomers are prepared from two normally solid addition curable elastomer components which are not blended together prior to cure, but are contacted with each other, preferably in the form of sheets or films.

Co-pending application, U.S. patent application Ser. No. 16/736,947 filed Jan. 8, 2020, incorporated herein by reference, describes a silicone composite that could be used for high temperature applications. The silicone composite can maintain its insulation properties with good dimensional stability under 500° C. for about at least 15 minutes and 1200° C. for about at least 10 seconds, or under 500° C. for about at least 30 minutes and 1200° C. for at least 10 seconds. The silicone composite described in the co-pending applications maintains its insulation properties with good dimensional stability without the use of a combustion process to form said composite. The composite is formed from a silicone which is compounded with a thermally decomposable inorganic filler. The compounded material is then injection molded, over molded, compression molded, cast, laminated, extruded, calendered, adhered or dispensed. When the silicone composite of the co-pending application is exposed to a high temperature, it forms an inorganic composite and maintains its insulating properties and dimensional stability.

SUMMARY OF THE INVENTION

An embodiment is directed to a hybrid silicone composite comprising a mixture of a solid form of high consistency silicone rubber (HCR) and a liquid form of high consistency silicone rubber compounded with an inorganic filler.

An embodiment is directed to a thin silicone composite film comprising a silicone mixture of a liquid form of high consistency silicone rubber and a solid form of a high consistency silicone rubber and a thermally decomposable inorganic filler which can be decomposed at a temperature of 500° C. and below, wherein said silicone composite film when exposed to a high temperature forms at least a portion of an inorganic composite and maintains its dimensional stability.

An embodiment is directed to an apparatus comprising a first metal part, a second metal or combustible part, a silicone composite layer, wherein the first metal part and the second metal or combustible parts are separated from each other and the silicone composite layer is spatially between the first metal part and the second metal or combustible part, wherein said silicone composite layer comprises a mixture of a liquid form of high consistency silicone rubber and a solid form of high consistency silicone rubber compounded with an inorganic filler and wherein said silicone composite layer is decomposable at a temperature of 500° C. or less and when said silicone composite layer is exposed to a high temperature it forms an inorganic composite having good dimensional stability.

An embodiment is directed to a connector, a circuit protection device, a relay device, a battery package, a power distribution unit or a battery disconnection unit, which comprises a first metal part, a second metal part or combustible part, a silicone composite layer, wherein the first metal part and the second metal or combustible part are separated from each other with the silicone composite layer spatially between the first metal part and the second metal or combustible parts, wherein the silicone composite layer comprises a mixture of a solid form of high consistency silicone rubber and a liquid form of high consistency silicone rubber compounded with an inorganic filler which can be decomposed at a temperature of 500° C. or less.

An embodiment is directed a component having a structural feature where it is desirable to limit heat propagation or to isolate high voltage in which the structural feature can be made from the silicone composite comprising a mixture of a solid form of high consistency rubber and a liquid form of high consistency rubber which is compounded with an inorganic filler.

Other features and advantages of the present invention will be apparent from the following more detailed in conjunction with the accompanying drawings which illustrate, by way of example, the principles of the invention.

DETAILED DESCRIPTION OF THE INVENTION

Figure 1:
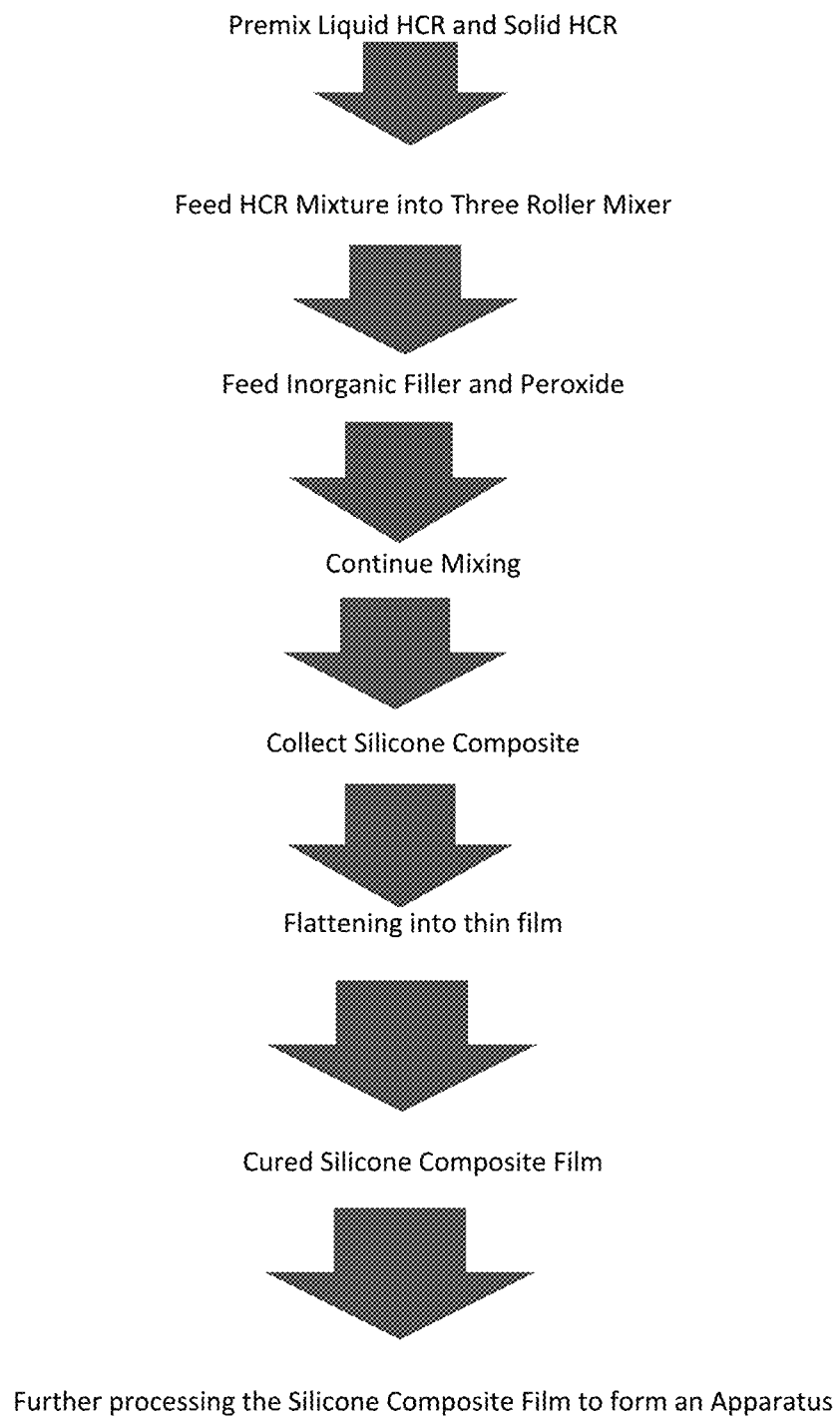
FIG. 1 is a flow-chart showing the steps used to form the hybrid silicone composite according to one embodiment of the invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

A new silicone composite material is provided which is able to maintain its insulating properties with good dimensional stability at 450° C., 500° C. or 650° C. for at least 5 minutes, 10 minutes, 15 minutes, 30 minutes or 60 minutes and at 1100° C., 1200° C. or 1300° C. for at least 5 seconds, 10 seconds, 20 seconds, 30 seconds or 60 seconds. The new hybrid silicone composite is able to provide similar insulation performance as plastics, glass, and ceramics. In one embodiment, this new silicone composite is flexible with a hardness not higher than shore D 90 including not higher than shore D 70, not higher than shore D 50, moldable and easier to manufacture than ceramics or glass, at a much lower cost. The new silicone composite material can be over molded, cast, laminated, inserted, calendered, extruded, adhered or dispensed into different shapes depending upon its end use application. Furthermore, this new silicone composite material has the properties of plastic before exposed to a high temperature and the properties of ceramic or glass after exposed to a high temperature. The novel silicone composite material is more flexible than most plastics due to the intrinsic properties of silicone and it maintains its shape and strength as a ceramic, after being exposed to high temperatures.

This novel silicone composite is formed from a mixture of a solid form of high consistency silicone rubber and a liquid form of high consistency silicone rubber compounded with an inorganic filler. This novel silicone composite when exposed to a high temperature converts the silicone composite into at least a portion of an inorganic composite and can be used as an insulation material in applications which require a stable insulating material or to isolate high voltage. In some embodiments, the silicone composite can convert into at least a portion of an inorganic composite at a temperature of 500° C. and above. In other embodiments, the silicone composite can convert into at least a portion of an inorganic composite at a temperature of no more than 500° C., for example, at a temperature from about 350° C. to less than 500° C., including a temperature from 400° C. to less than 500° C. Such low temperature converted inorganic composite will help the silicone composite maintain a good dimensional stability at a very broad temperature range from about 500° C. to about 1300° C. In a specific embodiment, the conversion is done by heating the composite. There is no flame, fire, or other combustion process used. This is very important for some applications in which a pressure will be applied on the insulating silicone composite as discussed hereinafter. In specific embodiments, the silicone composite is free of glass frits.

The silicone used in the silicone composite can be a mixture of high consistency rubber (HCR) in solid form and in liquid form. The silicone composite formed from these high consistency silicone rubber compounds offer good mechanical and electrical insulating properties. They provide for many different types of fabrication options, including extrusion, injection molding, compressing molding, 3D printing and calendering.

The solid form of the HCR can be found from about 10 to about 95 weight % of the total silicone rubber mixture that is used in the silicone composite. Preferably, about 45 to about 70 weight % of solid form of HCR is used in the composite. The amount of the solid form HCR is dependent upon the application that the silicone composite will be used in. Solid form HCR is a solid at 25-250° C., has a Mooney viscosity of about 10 to about 200 and with a hardness from Shore A 10 to Shore A 90. Solid form HCR has good flexibility, is easily manufactured and has relatively high mechanical strength prior to burning. However, solid HCR does not have as good burning performance as does liquid form HCR. An example of a solid HCR that can be used in the instant invention is Silplus 40 MP from Momentive American Industries.

The liquid form of the HCR can be found from about 5 to about 90 weight % of the total silicone mixture that is used in the silicone composite. Preferably, about 5 to about 50 weight % including about 5 to about 30 weight % of the liquid form of HCR is used in the silicone mixture. The amount of the liquid HCR is dependent upon the application which the silicone composite will be used in. Although the liquid HCR has relatively good burning performance compared to solid HCR, it is not as flexible as solid HCR. When burned without a load on top (for example, burned in open air), some bubble-like surface texture may be observed. It also needs to be manufactured using a high intensity mixer or speed mixer. Liquid HCR cannot be calendered into a thin film or transfer molded. It lacks adequate green strength for such processes. An example of a commercially available liquid HCR is 56308 88322-ASI from Momentive American Industries.

The mixture of the liquid HCR and solid HCR to be used in the silicone composite yields unique properties that the individual liquid HCR and solid HCR do not have themselves. For example, the mixture of liquid HCR and solid HCR has a tensile strain, the relative elongation of a material due to the application of a tensile force, between the high tensile strain of solid HCR and low tensile strain of the liquid HCR. Also, the mixture of solid HCR and liquid HCR results in a composite that has tensile stress, the force per unit area induced in the body in response to an externally applied force, comparable to a solid HCR which is better than the liquid HCR by itself. Also, using the mixture of the liquid HCR and the solid HCR in the silicone composite, enables the silicone composite to be processed into thinner samples, using many other processing methods such as transfer molding, calendering, compression molding, overmolding, extrusion, injection molding and the like, as compared to processing of liquid HCR itself. For example, the silicone composite can be made into a thickness of about 0.2 mm as compared to other silicone composites made from liquid HCR or liquid silicone composites which can be processed only to about 0.8 mm thickness.

The silicone mixture used in the silicone composite can also contain other additives, dependent upon the final desired end use. Examples of suitable additives include fumed silica, antioxidants, optional flame retardants, processing agents, pigments, lubricants, adhesion promoters, fluxes or catalysts. Suitable antioxidants include phenol antioxidants or amine antioxidants. Examples of suitable fluxes include $NH_4F$, $NH_4Cl$, and $Na_2B_4O_7$ and the like. Possible catalysts that can be used include peroxide or platinum catalysts. Examples of processing agents include conventional agents used for injection molding or transfer molding.

In some embodiments, the liquid form of HCR and the solid form of HCR are premixed. Any known mixing device can be used to premix the liquid form of HCR and solid form of HCR. In other embodiments, the liquid form of HCR, the solid form of HCR, and the fillers are mixed at the same time. In other embodiments, the liquid form of HCR and the filler are premixed before being mixed with the solid form of HCR.

The silicone mixture is then compounded with an inorganic filler. Any known mixing device can be used to compound the silicone mixture with the inorganic filler to form a homogenous mixture. Examples of mixing devices include a FlackTek Speed Mixer, a Ross mixer, a kneader mixer, a two-roll mixer, a three-roll mill, or any other device which can compound the two materials.

FIG. 1 shows one process which can be used to form the silicone composite. In the first step of this process, the liquid form high consistency silicone rubber is premixed with the solid form high consistency silicone rubber to form the silicone mixture. In the exemplary embodiment, a three-roller mixer used. Using a three-roller mixer, the desired gap of the roller is set. The gap is dependent upon the end application and easily determined by one of ordinary skill in the art. The silicone mixture is then fed into the roller. In the next step of the process, the inorganic filler and the peroxide are slowly added to the mixer. The inorganic filler in this example is magnesium hydroxide. The peroxide in this process acts as a curing agent. The materials are mixed for about 20 minutes after being loaded into the three-roller mixer. The resulting silicone composite of the instant invention is then collected. After the silicone composite is collected, it is flattened into a thin film using any flattening method such as compression molding, calendering, over-molding, and the like and can be cured to form a robust silicone composite film or a silicone composite layer. Thereafter, the silicone composite layer can be further processed or manipulated to form part of an apparatus of any desired shape or feature. In some embodiments, the silicone composite has a tensile stress from about 2.5 to about 10 MPa, including from about 4 to about 7 MPa after curing and a tensile strain from about 5% to about 150%, including from about 10% to about 100%. The advantage of this invention is that the silicone composite is very flexible and can be bent and stretched. This is different from previous formulations with only liquid form HCR, which is difficult to bend and stretch.

The inorganic filler used in the instant invention can be any inorganic filler. Preferably, the inorganic filler can be decomposed at a temperature of 500° C. or below. Examples of possible inorganic fillers which can be used include, but are not limited to, magnesium hydroxide, magnesium carbonate, calcium hydroxide, sodium bicarbonate, potassium bicarbonate, aluminum hydroxide, and mixtures thereof. The inorganic filler comprises from about 10 weight % to about 90 weight % of the silicone composite, preferably about 30 weight % to about 90 weight %, or about 50 weight % to about 80 weight % or about 30 weight % to about 70 weight %. Most preferably, magnesium hydroxide and aluminum hydroxide are used due to their flame retardant properties. In one embodiment, at least 30 weight % of magnesium hydroxide or aluminum hydroxide is preferably used to achieve the desired result. The inorganic fillers preferably have a particle size of 20 microns or smaller, 10 microns or smaller, more preferably, 5 microns or smaller and most preferably 3 microns or smaller. Specifically, for magnesium hydroxide, the particle size is 10 microns or smaller, more preferably, 5 microns or smaller and most preferably 3 microns or smaller.

Once the silicone mixture and the inorganic filler are compounded, they are processed into a silicone composite which can then be processed into any desired shape. Any conventional molding, casting, laminating, calendering, inserting, 3D printing, extruding, adhering or dispensing process can be used to achieve the desired shape of the processed composition. Examples of suitable molding processes include injection molding, over-molding, compression molding, transfer molding and calendering. In some embodiments, the compounded silicone mixture and inorganic filler are dispensed or extruded into the desired shape.

If the silicone composite is not cured during the processing of the silicone composite, the processed silicone composite can be cured after processing to result in a cured silicone composite film. Curing can occur at room temperature, although it is preferable to cure the composition at a temperature range from about 50-200° C. The type of curing used, as well as the curing conditions, are dependent upon the type of silicone and curing agent that are used. For example, the silicone composite can be cured by moisture, ultraviolet light, or by exposing the composite to a high temperature. In one example, the silicone composite can be cured using peroxide. In some embodiments, the silicone composite can be cured from about 120° to about 200° C., from about 150° to about 180° C. for approximately from about 2 to about 30 minutes, including from about 2 to about 10 minutes.

The silicone composite of the instant invention has many desirable properties. The silicone composite is easily manufactured in comparison to other silicone composites. The silicone composite is flexible and can be easily bent 90°. In some embodiments, the silicone composite film can be bent around a 10 mm radius, or around a 4 mm radius, or around a 2 mm radius without any cracks visually. The silicone composite has a viscosity of about 10000 to about 1000000 Pa·S at the shear rate of 1.0 rad/d at 25° C. The density of a silicone composite according to the instant invention ranges from about 1.3 to about 1.8 g/cm$^3$, including from 1.3 to 1.5 g/cm$^3$. Such low density is important for automotive and airspace applications where lightweight, high-temperature insulation materials are needed. Inorganic insulating materials typically have a higher density. For example, glass has a density around 2.5 g/cm$^3$ and ceramics, typically have a density from 2 to 6 g/cm$^3$. The silicone composite of the invention has good shape, strength and dimension prior to exposure to high temperature and maintains the shape, strength and dimension even after being exposed to high temperatures. The silicone composite has better overall mechanical properties than the individual components that make up the silicone mixture that is used in the silicone composite. Moreover, the silicone composite of the instant invention has a lower weight density than other silicone composites with inorganic fillers and can be formed into thin layers.

For example, a silicone composite film formed by the instant invention can be bent at a 2 mm. radius without cracks when examined visually. The thickness of a silicone composite film can be less than 1 mm, including less than 0.6 mm, or less than 0.5 mm. Low thickness in coupling with low density mentioned previously, leads to significant weight reduction. Compared to inorganic insulation materials such as ceramic film, mica film and the like, the silicone composite film of the instant invention has a weight reduction of more than 25%, including more than 50%, or more than 75% per unit area.

Figure 2:
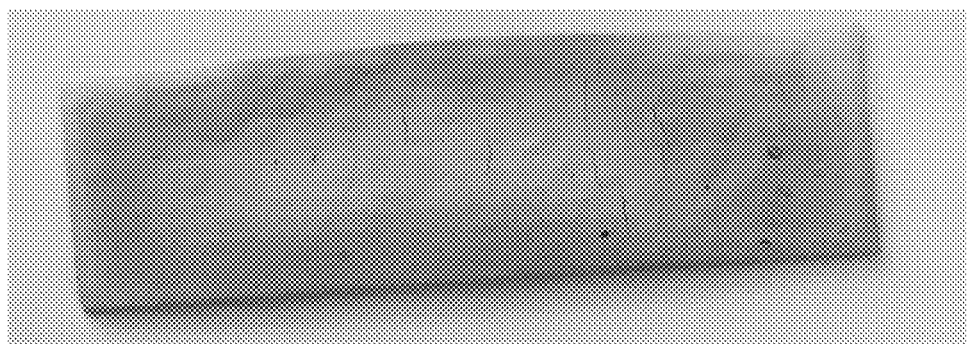
FIG. 2 is a photograph of a molded sample of solid high consistency rubber and magnesium hydroxide filler which was subjected to 500° C. for 15 minutes with a load.
Figure 3:
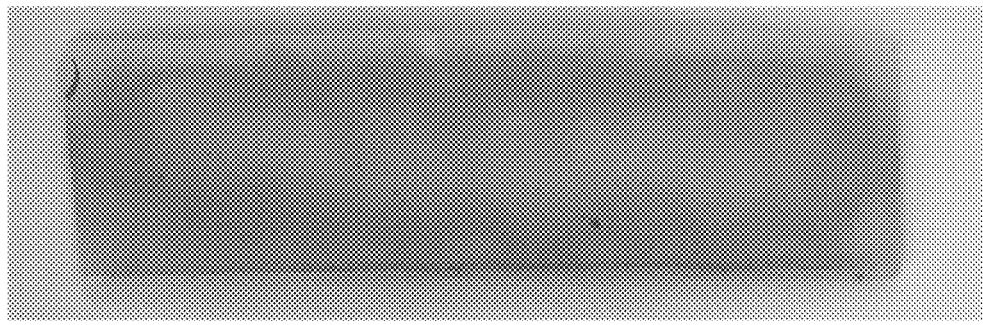
FIG. 3 is a photograph of a molded sample of a silicone composite containing the hybrid silicone composite of the instant invention which was subjected to 500° C. for 15 minutes with a load.

FIGS. 2 to 7 show molded samples of various silicone composites subject to the 500° C. burning test. FIGS. 2 and 3 show molded samples being placed in a 500° C. oven for 15 minutes under a load. The sample in FIG. 2 was made from a solid form of high consistency silicone rubber compounded with 50 weight % of an inorganic filler. The sample in FIG. 2 was processed using the process of co-pending U.S. patent application Ser. No. 16/736,947. FIG. 3 shows a sample made according to the instant invention made of a silicone mixture and 50 weight % of an inorganic filler. The silicone mixture comprises 90 weight % of the total silicone mixture of a solid high consistency rubber and 10 weight % of a total silicone mixture of a liquid form of high consistency rubber. As evident from the photographs upon being exposed to high temperatures under load, the sample of FIG. 3 did not exhibit any microcracks visible to the eye and maintained its strength.

Figure 4:
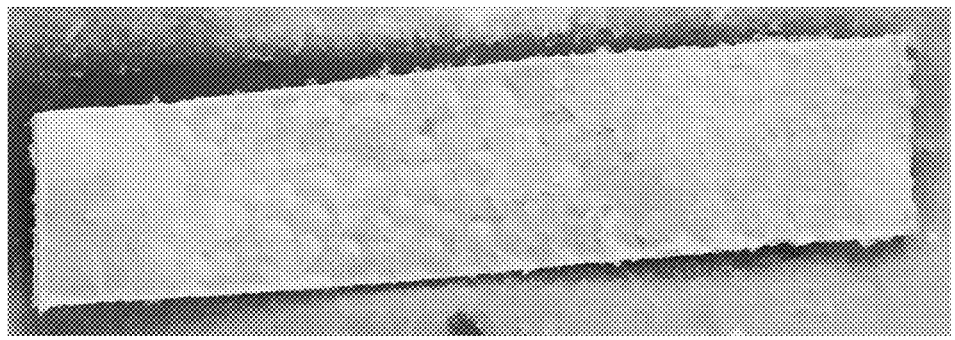
FIG. 4 is a photograph of a molded sample of a liquid high consistency rubber and magnesium hydroxide filler which was subject to 500° C. for 15 minutes without any load.
Figure 5:
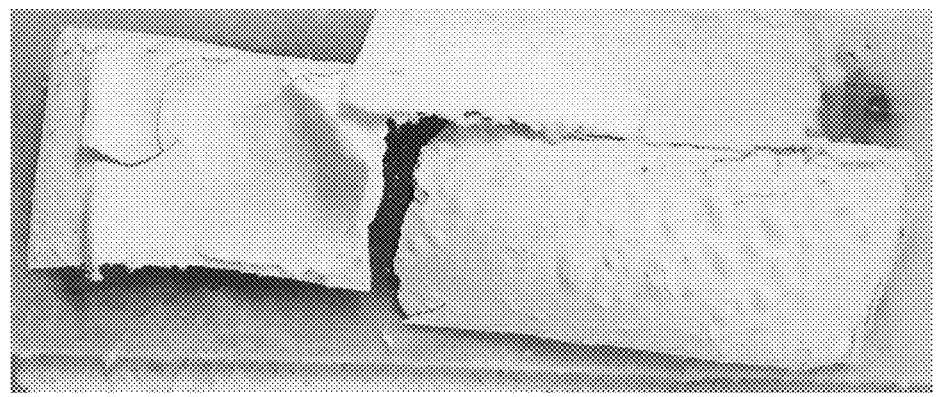
FIG. 5 is a photograph of a molded sample of a solid high consistency rubber and magnesium hydroxide filler which was subject to 500° C. for 15 minutes without a load.
Figure 6:
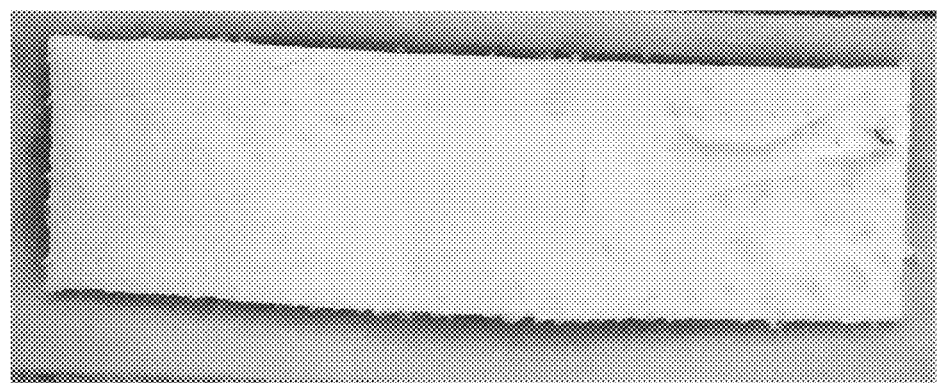
FIG. 6 is a photograph of a molded sample of a mixture of a liquid form of high consistency silicone rubber and a solid form of high consistency silicone rubber compounded with magnesium hydroxide filler which was subject to 500° C. for 15 minutes without a load.

FIGS. 4 to 6 show molded samples of various silicone composites. The samples were placed in a 500° C. oven for 15 minutes without any load. The sample of FIG. 4 is comprised of solely liquid form of high consistency rubber with 50 weight % of an inorganic filler. The sample of FIG. 5 is comprised of solely a solid form of a high consistency rubber with 50 weight % of an inorganic filler. The sample of FIG. 6 is comprised of a silicone mixture with 50 weight % of an inorganic filler. The silicone mixture comprises 90 weight % of a solid high consistency rubber based on the total weight of the silicone mixture and 10 weight % of a liquid high consistency rubber based upon the total silicone mixture. As evident from the photographs, the sample of the instant invention in FIG. 6 showed improved qualities as compared to the samples of FIGS. 4 and 5. The sample in FIG. 5 did not retain the mechanical integrity after exposure to 500° C. Although the sample in FIG. 4 did show a solid film after exposure, the surface of the film is not smooth. Many bubble-like textures can be observed.

Figure 7:
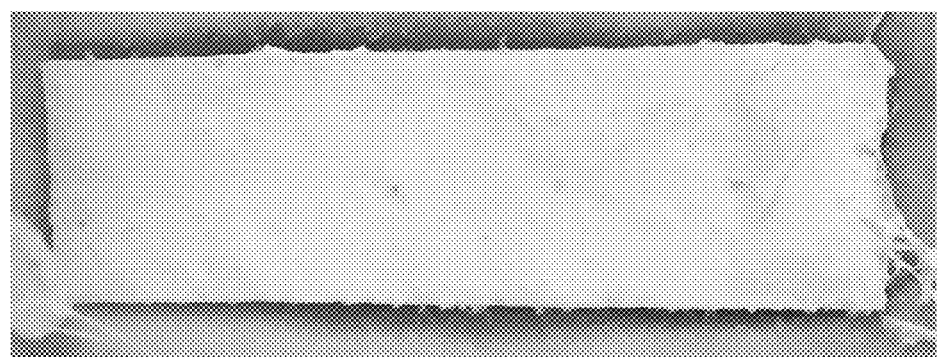
FIG. 7 is a photograph of a molded sample of a mixture of a liquid form of high consistency silicone rubber and a solid form high consistency rubber compounded with magnesium hydroxide filler which was subject to a 500° C. for 15 minutes without a load.

FIG. 7 shows a sample according to the instant invention with a higher loading of the inorganic filler. The molded sample of FIG. 7 used the silicone mixture of the sample of FIG. 6 with 60 weight % of the inorganic filler. The silicone mixture comprised 90 weight % of solid high consistency rubber and 10 weight % of liquid high consistency rubber based upon the total silicone mixture. The sample performed equally as well as the sample of FIG. 6 and shows that the instant invention can be used for high temperature applications at various loadings of inorganic filler.

Figure 8:
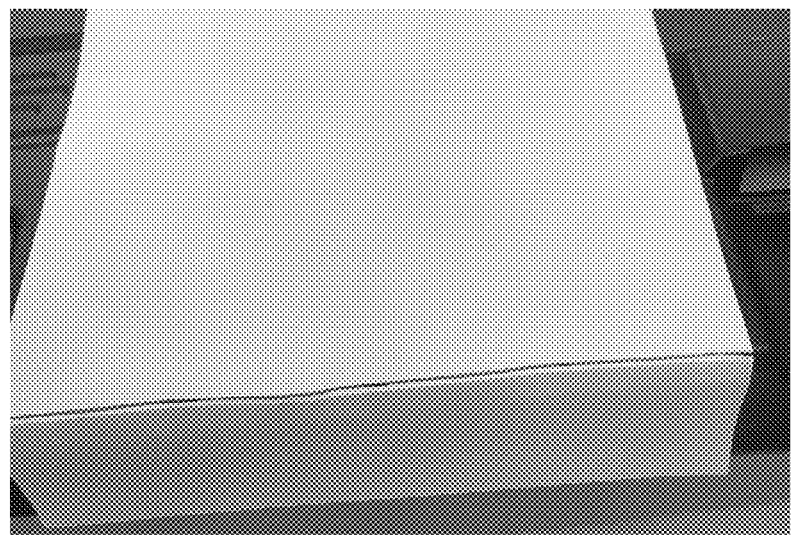
FIG. 8 is a photograph of a molded sample of a liquid form of high consistency silicone rubber and magnesium hydroxide filler which was subject to a 90° bending.
Figure 9:
FIG. 9 is a photograph of a molded sample of a mixture of a liquid form of high consistency silicone rubber and a solid form of high consistency rubber compounded with magnesium hydroxide filler which was subject to 90° bending.

FIGS. 8 and 9 illustrate the ability of the silicone composite of the instant invention to perform under a 90 degree bending test. FIG. 8 shows a molded sample of a liquid form HCR compounded with 60 weight % of magnesium hydroxide. The photograph shows that the sample cracked. FIG. 9 shows a photograph of a molded sample of the silicone composite which is made of a mixture of liquid HCR and solid HCR compounded with 60 weight % of magnesium hydroxide. As evident from the photograph, the sample was bent without cracking.

The silicone composite can be used in a variety of applications. The silicone composite is flexible and moldable. The silicone composite formed according to the instant invention, when exposed to high temperature up to 1300° C., maintains its shape, strength and dimensional stability with a shrinkage of no more than 25%, including a shrinkage of no more than 20%, or no more than 15%. It is desired that there is an expansion rather than a shrinkage. After being exposed to a high temperature, the silicone composite can stay in its desired shape. There is no cracking, delamination or decomposition into a powdered form. In this invention, expansion in any dimension is not considered a dimensional stability change. The silicone composite retains its shape under a load of $5 \times 10^4$ N/square meter, including no more than $1 \times 10^4$ N/square meter or no more than $1 \times 10^3$ N/square meter at a temperature of greater than 500° C. In some of embodiments, there is no load. Once the silicone composite is exposed to high temperatures, without limitation to any theory, it is believed that two additional reactions occur. First, the silicone in the silicone composite is decomposed to silicone oxide ($SiO_x$). This silicone oxide then reacts with the inorganic filler or its decomposed components and thereby forms an inorganic composite. This inorganic composite has excellent dimensional stability, strength and insulating properties.

Another aspect of this invention is an apparatus formed using the silicone composite. In one embodiment, the apparatus comprises a first metal part, a second metal or combustible part, and a composite silicone layer located spatially between the first and the second metal or combustible parts. The metal layers can be made of any suitable metals. Examples of suitable metals include copper, copper alloy, aluminum or an aluminum alloy. Examples of combustible parts include a battery, such as lithium-ion battery, solid-state battery and the like. The composite silicone layer of this apparatus has a thickness, for example, of less than 5 mm, including less than 2 mm, including less than 1 mm, including less than 0.8 mm. The apparatus can be a connector, a circuit protection device, a relay device, or a battery package, for example. Any other type of apparatus having the desired qualities can be made from this silicone composite. Other materials, such as a polymer layer can be used together with the silicone composite layer, for example as a mechanical support.

The silicone composite can be used in any application where mechanical strength and electrical insulation are demanded and where the silicone composite is exposed to high temperatures. The size of the silicone composite is dependent upon the end use application. Furthermore, the processing conditions are also dependent upon the end use of the silicone composite. For example, silicone composite of the instant invention can be used in a traction battery (electric vehicle battery) to insulate the aluminum busbar that is used for cell connection. Without insulation, it is possible that if one cell generates excessive heat, other cells or the complete battery assembly may be set off. As a result, the soft and low melting aluminum busbar will be deformed, and a short circuit may be possible. Using the silicone composite of the instant invention as an insulating material for the aluminum busbar will help protect the circuit from shorting and even catching on fire.

The silicone composite of the instant invention can also be used as a structural feature of a component where it is desirable to limit heat propagation through the component or to isolate high voltage in a portion of the component. The silicone composite may in such situation need a mechanical support. One such example of a mechanical support is using molded thermal plastic frames. The silicone composite of the instant invention can then be glued or otherwise attached on top of the molded thermal plastic frames. Alternatively, a two-shot molding process can be used where the silicone composite is molded on top of the thermal plastic frames. In another embodiment in which the silicone composite can be used as a structural feature of a component, glass filler or loose fiber or fabric may be added to provide mechanical support. In yet another embodiment in which the silicone composite is used as a structural feature of a component, a metal mesh can be used to provide mechanical support. In this embodiment, the silicone composite of the instant invention can be over molded directly onto the metal mesh. In a further embodiment of using the silicone composite as a structural feature of a component, the silicone composite can be deposited on both sides of a thin metal foil for additional mechanical strength. Examples of such foil, include but are not limited to aluminum or copper foil. Any metal foil can be used as to provide mechanical strength, so long as it does not adversely react with the silicone composite.

In some embodiments, the cured silicone composite film or the silicone composite layer in the apparatus has low outgassing. The outgassing can be measured for example by thermogravimetric analysis (TGA) at a temperature such as 105° C. or 125° C., depending upon the application for a period of time of 2 hours or 4 hours. The silicone composite film of the instant invention has a weight loss of less than 0.5 weight %, including less than 0.3 weight % or less than 0.1 weight %.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

We claim:

1. A silicone composite comprising: a silicone mixture and a thermally decomposable inorganic filler which can be decomposed at a temperature of 500° C. and below, wherein said inorganic filler is from about 10 weight % to about 90 weight % of said silicone composite, wherein said silicone composite when exposed to a high temperature forms at least a portion of an inorganic composite and maintains its dimensional stability wherein said silicone composite has a viscosity from about 10000 to about 1000000 Pa·S at a shear rate of 1.0 rads/s at 25 degrees C., and a density of about 1.3 to about 1.8 g/cm³ and wherein said silicone mixture comprises a liquid high consistency silicone rubber and a solid high consistency silicone rubber, said solid high consistency rubber is a solid at 25-250° C., has a Mooney viscosity of about 10 to about 200 and with a hardness from Shore A 10 to Shore A 90.

2. The silicone composite according to claim 1, wherein the silicone composite is capable of forming at least a portion of an inorganic composite at a temperature of no more than 500° C. and maintaining its dimensional stability.

3. The silicone composite according to claim 1, wherein said inorganic filler is chosen from the group comprising: magnesium hydroxide, magnesium carbonate, calcium hydroxide, sodium bicarbonate, potassium bicarbonate, aluminum hydroxide and mixtures thereof.

4. The silicone composite according to claim 1, wherein the silicone composite further includes fumed silica, antioxidants, fluxes or catalysts.

5. The silicone composite according to claim 1, wherein said silicone composite is moldable or calenderable.

6. The silicone composite according to claim 1, wherein said liquid high consistency silicone rubber comprises from about 5 weight % to about 90 weight % of the total weight of the silicone mixture.

7. The silicone composite according to claim 1, wherein the silicone composite has a density of about 1.3 to about 1.6 g/cm³.

8. A silicone composite film comprising a silicone mixture and a thermally decomposable inorganic filler which can be decomposed at a temperature of 500° C. and below, wherein said silicone composite film when exposed to a high temperature forms at least a portion of an inorganic composite and maintains its dimensional stability, wherein said silicone composite film has a tensile stress from about 2.5 to about 10 MPa after curing, a tensile strain from about 10% to about 100%, and density from about 1.3 to 1.8 g/cm³ and wherein said silicone mixture comprises a liquid high consistency silicone rubber and a solid high consistency silicone rubber, wherein said solid high consistency silicone is a solid at 25-250° C., has a Mooney viscosity of about 10 to about 200 and with a hardness from Shore A 10 to Shore A 90.

9. The silicone composite film according to claim 8, wherein the silicone composite film has a thickness of less than 1 mm.

10. The silicone composite film according to claim 8, wherein said silicone composite film can bent at a 2.0 mm radius without cracks when examined visually.

11. The silicone composite film according to claim 8, wherein said silicone composite film further includes a support chosen from the group consisting of metal foils, metal meshes and glass fibers embedded in said silicone composite film.

* * * * *